United States Patent
Flanagan et al.

(10) Patent No.: US 8,982,989 B2
(45) Date of Patent: Mar. 17, 2015

(54) PROCESS VARIABLE TRANSMITTER WITH VARIABLE FREQUENCY CLOCK CIRCUIT FOR REJECTION OF CLOCK SYNCHRONOUS NOISE

(71) Applicant: Rosemount Inc., Chanhassen, MN (US)

(72) Inventors: Peter J. Flanagan, St. Louis Park, MN (US); David G. Tyson, Eden Prairie, MN (US); John P. Schulte, Eden Prairie, MN (US); Eugene Korolev, Maple Grove, MN (US)

(73) Assignee: Rosemount Inc., Chanhassen, MN (US)

( * ) Notice: Subject to any disclaimer, the term of this patent is extended or adjusted under 35 U.S.C. 154(b) by 0 days.

(21) Appl. No.: 13/930,165

(22) Filed: Jun. 28, 2013

(65) Prior Publication Data

US 2015/0003560 A1  Jan. 1, 2015

(51) Int. Cl.
*H04L 27/00* (2006.01)
*H04L 25/08* (2006.01)
*H04L 7/00* (2006.01)
*H04L 25/06* (2006.01)

(52) U.S. Cl.
CPC .............. *H04L 25/08* (2013.01); *H04L 7/0091* (2013.01); *H04L 25/06* (2013.01); *H04L 25/068* (2013.01)
USPC ........... 375/295; 375/226; 375/227; 375/297; 375/346

(58) Field of Classification Search
CPC ...... H04L 25/08; H04L 7/0091; H04L 25/068

USPC .......................... 375/295, 226, 227, 297, 346
See application file for complete search history.

(56) References Cited

U.S. PATENT DOCUMENTS

| 7,317,774 | B2 * | 1/2008 | Richey et al. ................. 375/355 |
| 7,558,687 | B1 | 7/2009 | Bode |
| 8,406,722 | B2 * | 3/2013 | Roy .............................. 455/296 |
| 8,547,317 | B2 * | 10/2013 | Lee ................................. 345/99 |
| 2012/0051399 | A1 * | 3/2012 | Rud et al. ...................... 374/185 |
| 2014/0153627 | A1 * | 6/2014 | Gurney et al. ................ 375/227 |

FOREIGN PATENT DOCUMENTS

| EP | 1 353 252 A2 | 10/2003 |
| WO | WO 02/14964 | 2/2002 |

OTHER PUBLICATIONS

"Spread-Spectrum Clocking", www.ni.com/white.paper/4154/en, 2 pages, Publish Date: Nov. 2, 2009.
Notification of Transmittal of the International Search Report and the Written Opinion of the International Searching Authority, from PCT/US2014/039913, dated Sep. 15, 2014.

\* cited by examiner

*Primary Examiner* — Dhaval Patel
(74) *Attorney, Agent, or Firm* — Westman, Champlin & Koehler, P.A.

(57) ABSTRACT

In a process variable transmitter, a sensor signal is sampled, using a clock signal, at a sensor sampling frequency. Interference is also sampled at the sensor sampling frequency. A comparison is made to determine whether the interference at the sensor sampling frequency or harmonics of the sensor sampling frequency exceed a threshold level. If so, the clock signal is changed to adjust the sensor sampling frequency away from the frequency of the interference.

20 Claims, 6 Drawing Sheets

US 8,982,989 B2

PROCESS VARIABLE TRANSMITTER WITH VARIABLE FREQUENCY CLOCK CIRCUIT FOR REJECTION OF CLOCK SYNCHRONOUS NOISE

FIELD

The present invention relates to process variable transmitters used in process control and monitoring systems. More specifically, the present invention relates to varying the clock frequency to reject clock synchronous noise.

BACKGROUND

Process variable transmitters are used to measure process parameters in a process control or monitoring system. Microprocessor-based transmitters often include a sensor, an analog-to-digital converter for converting an output from the sensor into a digital form, a microprocessor for compensating the digitized output, and an output circuit for transmitting the compensated output. Currently, this transmission is normally done over a process control loop, such as a 4-20 mA control loop, or wirelessly.

One exemplary parameter that is measured by such a system is pressure, which is sensed by measuring the capacitance of a capacitance-based differential pressure sensor. Of course, these types of pressure sensors are only exemplary and others can be used as well. Similarly, pressure is only one exemplary process variable and a wide variety of other process control parameters can be measured as well, such as flow, pH, temperature, level, etc. Therefore, while the present discussion proceeds with respect to a pressure sensor, it will be appreciated that this discussion could just as easily proceed with respect to other sensors.

Process variable transmitters are often subjected to various types of noise, which can affect the accuracy of the measurement circuit. A significant source of noise in the analog-to-digital (A/D) converter is synchronous noise. Synchronous noise is noise that occurs at the same relative time in the A/D conversion process, on repetitive conversions. An example of this type of disturbance is bus noise produced by a microprocessor. If the A/D converter is synchronous with the processor bus, this type of noise can produce an offset error in the A/D converter output.

Various kinds of process variable transmitters are subjected to electromagnetic compatibility (EMC) testing procedures which look for susceptibility to disturbances produced in conducted radio frequency (RF) immunity tests. Synchronous noise is one mechanism responsible for a process variable transmitter being susceptible to this type of disturbance.

In this type of EMC testing procedure, common mode voltage noise is applied to the loop wiring relative to the module housing of the transmitter. This voltage shows up in the measurement circuit as a result of capacitive strays between the housing and the sensor. When the A/D converter samples the sensor signal, it samples noise coupling through the strays as well, such that noise at or near harmonics of the sampling frequency show up in the base band, and show up as measurement error. The system response of a process variable transmitter to this type of noisy input occurs in two different categories. The first is a wide band error and the second is a narrow band error. Narrow band errors are produced when interference feeds into the sensor sampling circuit at or near the sensor sampling frequency or harmonic. This results in aliasing errors in the base band at very low frequencies (close to direct current or DC).

SUMMARY

In a process variable transmitter, a sensor signal is sampled, using a clock signal, at a sensor sampling frequency. Interference is also sampled at the sensor sampling frequency. A comparison is made to determine whether the interference at the sensor sampling frequency or harmonics of the sensor sampling frequency exceed a threshold level. If so, the clock signal is changed to adjust the sensor sampling frequency away from the frequency of the interference.

DETAILED DESCRIPTION OF ILLUSTRATIVE EMBODIMENTS

Figure 1:
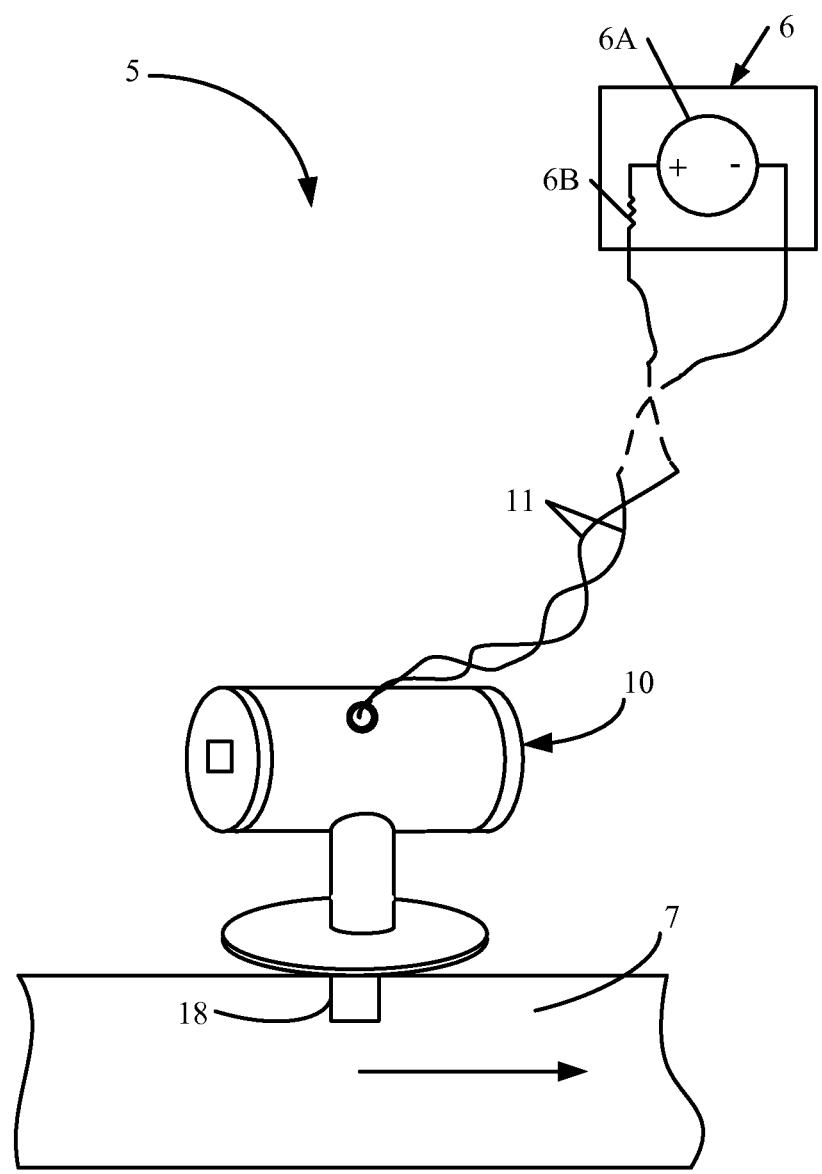
FIG. 1 is a simplified diagram showing an industrial process control system.

FIG. 1 is a simplified block diagram of an industrial process control system 5. In FIG. 1, process piping 7 carries a process fluid. A process variable transmitter 10 is coupled to the process piping 7. Transmitter 10 includes a process variable sensor 18 which, in one embodiment, comprises a pressure sensor. However, this is exemplary only. Transmitter 10 transmits information to a remote location, such as a process control room 6. The transmission can be over a process control loop such as a 2-wire control loop 11. The process control loop can be in accordance with any desired format including, for example, a 4-20 mA process control loop, a process control loop which carries digital communications, a wireless process control loop, etc. In the example shown in FIG. 1, the process control loop 11 is powered by a power supply 6A at control room 6. This power is used to provide power to the process variable transmitter 10. A sense resistor 6B can be used to sense the current flowing through loop 11, although other mechanisms can be used as well.

Figure 2:
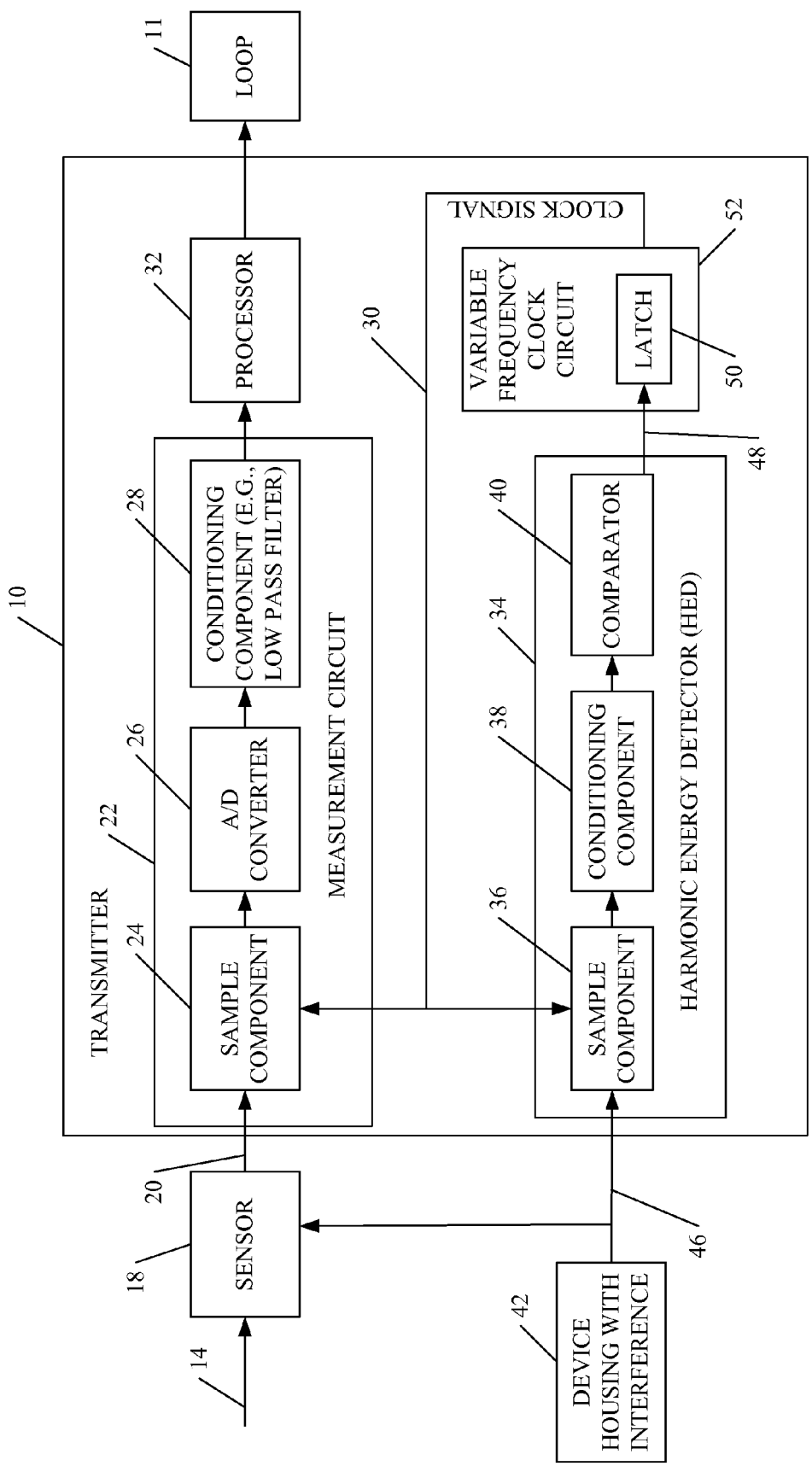
FIG. 2 is a block diagram showing the transmitter of FIG. 1 in more detail.

FIG. 2 is a block diagram of a portion of industrial process control system 5, shown in FIG. 1, and transmitter 10 is shown in greater detail. Transmitter 10 illustratively includes measurement circuit 22, processor 32, harmonic energy detector 34 and variable frequency clock circuit 52. Measurement circuit 22, itself, illustratively includes sample component 24, analog-to-digital (A/D) converter 26 and conditioning component 28 (such as a low pass filter). Harmonic energy detector 34, itself, includes sample component 36, conditioning component 38, and comparator 40.

In FIG. 2, sensor 18 is illustratively a process variable sensor that receives input 14 from a process being sensed. Input 14 is illustratively the process fluid flowing through piping 7 (shown in FIG. 1), and sensor 18 is illustratively a pressure sensor. However, sensor 18 could also be a different type of sensor, such as one for sensing, pH, flow, temperature, etc. Sensor 18 can also be one of number of different types of pressure sensors. In any of these embodiments, sensor 18 illustratively provides an analog output signal 20, indicative of the sensed parameter, to measurement circuit 22, in transmitter 10.

In one embodiment, the signal 20 is then provided to sample component 24. Sample component 24 illustratively samples the sensor signal 20 at a sample frequency provided by clock signal 30. The sampled analog signal 20 is provided to A/D converter 26, where it is converted to a digitized output that is provided to conditioning component 28, and eventually to processor 32. The digitized output from conditioning component 28 is illustratively a digital representation of the analog signal 20 provided by sensor 18. Processor 32 has associated memory and clock circuitry and can compensate the digital representation and provide information regarding the sensed parameter over process control loop 11. It should be noted that processor 24 can include an input/output (I/O) circuit, or an I/O circuit can be provided separately, that transmits information in a digital format on loop 11, or in an analog format, such as by controlling current flow through loop 11, or by providing an analog output voltage.

As discussed in the background portion, interference coupled from the housing of transmitter 10 to the circuitry in transmitter 10 can induce narrow band errors, particularly where the interference occurs at a frequency that is close to the frequency of clock signal 30 (at which the sensor signal 20 is sampled) or harmonics thereof. Therefore, in the embodiment shown in FIG. 2, transmitter 10 also includes a harmonic energy detector 34.

Harmonic energy detector 34, itself, includes sample component 36, conditioning component 38 and comparator 40. Sample component 36 is coupled to receive the interference signal 46 from the device housing (indicated by block 42) and sample it at the same frequency at which the sensor signal 20 is sampled by measurement circuit 22. It can thus be seen that sample component 36 receives the same clock signal 30 that is provided to sampled component 24. The sampled interference signal 46 is provided from sampling component 36 to conditioning component 38 which can illustratively amplify and filter, or otherwise condition, interference signal 46, and provide it to comparator 40. In one embodiment, for interference at frequencies at or near the harmonics of the sensor sampling frequency, the resulting alias frequency is less than 5 Hz. Conditioning component 38 can thus be a low pass filter that only passes interference with a frequency of less than 5 Hz. This is given by way of example only, and it can be any other type of filter or conditioning circuitry as well. Conditioning component 38 outputs a low voltage when interference is at a frequency and amplitude that does not cause large narrow band errors. It outputs a high voltage level when the interference is at a frequency and amplitude that causes large narrow band errors.

Comparator 40 compares the input voltage from conditioning component 38 to a reference voltage. When the input voltage exceeds the reference voltage, comparator 40 generates a trigger signal to the variable frequency clock circuit 52. Thus, even if the interference is very close to a harmonic comparator 40 will not trigger clock circuit 52 until the interference also has sufficient amplitude to trip comparator 40. In one embodiment, comparator 40 will be tripped if the interference has sufficient amplitude and is at an interference frequency that is within 30 Hz of a harmonic. If so, then it may cause problems at the output of transmitter 10. Therefore, if comparator 40 detects sufficient energy in the interference signal, and it occurs at a frequency near one of the harmonics (e.g., within 30 Hz of one of the harmonics), it sends a trigger signal 48 to latch 50 in variable frequency clock circuit 52. When latch 50 is actuated by trigger signal 48, variable frequency clock circuit 52 illustratively changes the clock frequency of clock signal 30 to switch to a different sampling frequency that is at least a given distance away from the original sensor sampling frequency. The distance between the two sampling frequencies is chosen so that the narrow bands of sensitivity for each sample frequency do not overlap. By way of example, assuming that the approximate width of the narrow band is 20 Hz, then when variable frequency clock circuit 52 changes the frequency of clock signal 30, it changes it so that it is 50 Hz away from the previous frequency of clock signal 30. This exceeds the 20 Hz width, with some margin. This is exemplary only.

A more detailed example may be helpful. Assume that variable frequency clock circuit 52 switches between only two separate clock frequencies. If the first frequency is 460 kHz, then the sampling frequency of clock signal 30 may illustratively be 23.0 kHz (for example, the clock frequency divided by 20). If the second frequency is 462 kHz, then the sampling frequency will be 23.1 kHz (again the clock frequency divided by 20). Since the two sampling frequencies are 100 Hz apart, they satisfy the criteria that the two sampling frequencies provided by variable frequency clock circuit 52 are at least 50 Hz apart.

Figure 3:
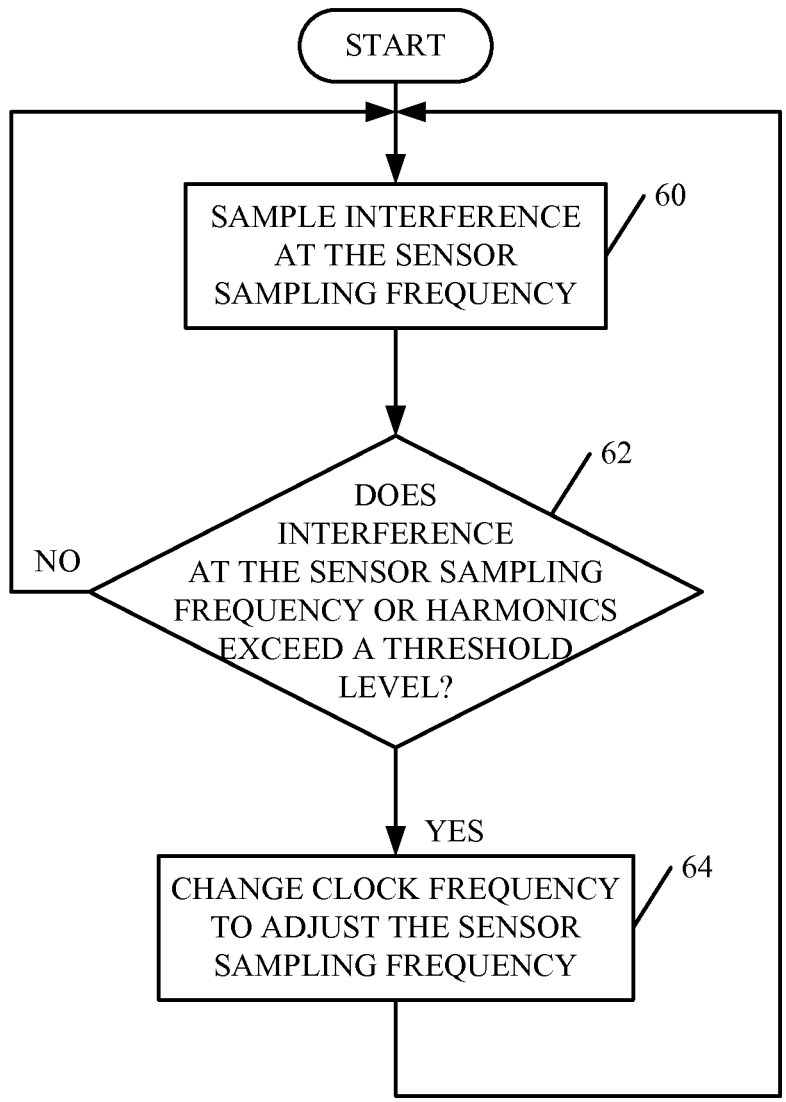
FIG. 3 is a flow diagram illustrating one embodiment of the overall operation of a harmonic energy detector and variable frequency clock circuitry shown in FIGS. 1-2.

FIG. 3 is a flow diagram illustrating one embodiment of the overall operation of harmonic energy detector 34 and variable frequency clock circuit 52, in sampling interference and changing the frequency of the clock used to sample sensor signal 20. First, sample component 36 samples the interference at the sensor sampling frequency (the same frequency used to sample sensor signal 20). This is indicated by block 60 in FIG. 3.

Comparator 40 then determines whether the interference which is close enough to the sensor sampling frequency (or harmonics thereof) exceeds a threshold level. This is indicated by block 62. If not, processing reverts back to block 60 where sample component 36 continues to sample interference from interference signal 46 at the same frequency that sample component 24 samples sensor signal 20.

However, if, at block 62, comparator 40 determines that the interference at (or near) the sensor sampling frequency or one of the harmonics exceeds a threshold level, then it provides a trigger signal 48 to variable frequency clock circuit 52. In the embodiment shown in FIG. 2, the trigger latches latch 50 which indicates to circuit 52 that it is to change the clock frequency. Variable frequency clock circuit 52 changes to an alternate clock frequency so that signal 30 is now at a new sensor sampling frequency, and signal 30 is again provided to both sampling component 24 and sampling component 36, at the new frequency. Therefore, sampling component 36 (which samples interference signal 46) again samples at the same frequency as sample component 24 (which samples sensor signal 20). Changing the clock frequency to adjust the sensor sampling frequency is indicated by block 64 in FIG. 3.

Figure 4:
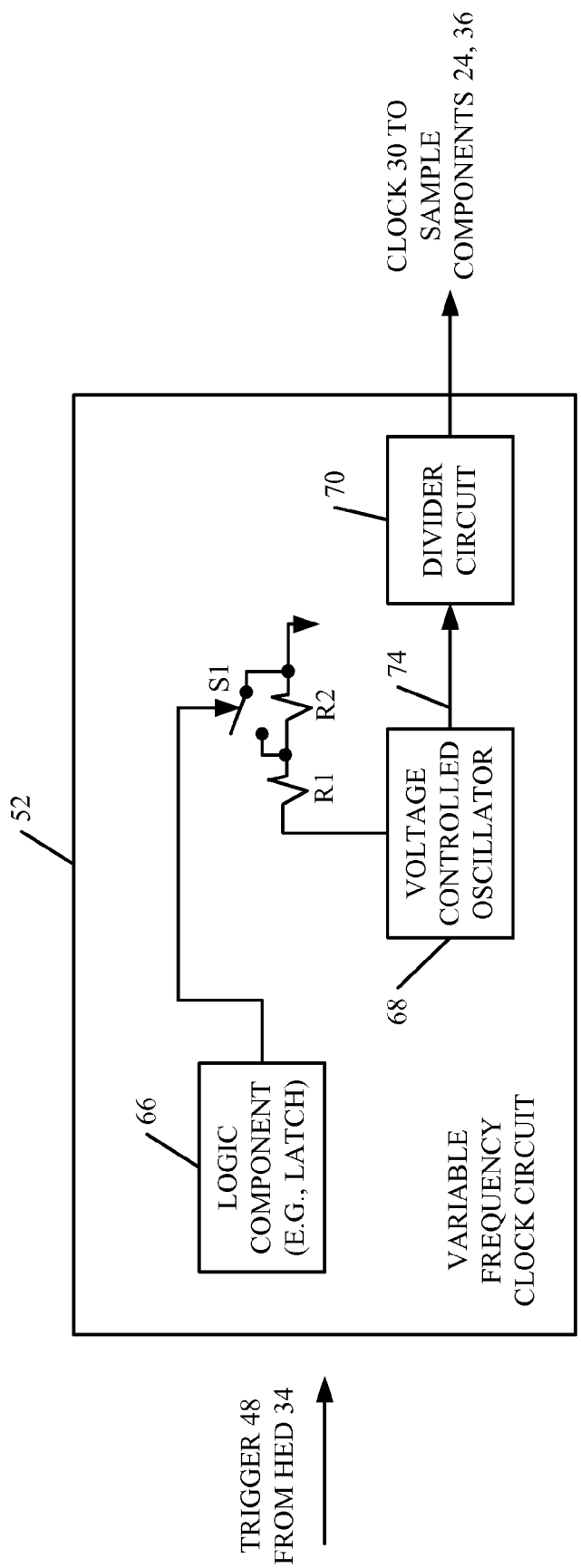
FIG. 4 is a block diagram of one embodiment of a variable frequency clock circuit.

FIG. 4 is a block diagram showing one embodiment of variable frequency clock circuit 52 in more detail. FIG. 4 shows that, in one embodiment, variable frequency clock circuit 52 illustratively includes logic component 66 (which can be the same as latch 50 or a different logic component), voltage controlled oscillator 68, clock divider circuit 70, resistors R1 and R2 and switch S1. In the embodiment shown in FIG. 4, variable frequency clock circuit 52 only switches between two different clock frequencies. However, it will be appreciated that it could just as easily provide for the selection among a variety of different clock frequencies.

In any case, logic component 66 receives the trigger signal 48 from harmonic energy detector 34. This indicates that the interference reflected by signal 46 is close enough to the sensor sampling frequency or one of the harmonics, and exceeds a threshold level, so that it will be problematic in the output of transmitter 10. Therefore, logic component 66 provides a signal to switch S1 to change the state of switch S1. If switch S1 is currently open, it will be closed. If it is currently closed, it will be opened. This changes the configuration of the resistive network provided by resistors R1 and R2, and thus changes the voltage level input to voltage controlled oscillator 68. Therefore, the frequency of the output signal 74 of voltage controlled oscillator 68 will also change. That is, if switch S1 is closed, then resistor R2 is bypassed and voltage controlled oscillator 68 will provide an output signal 74 at a first frequency. However, if switch S1 is opened, then resistor R2 is in the resistive network and voltage controlled oscillator 68 will provide an output signal 74 at a second frequency, which is at least a threshold distance from the first frequency. In one embodiment, the threshold distance is approximately 50 Hz, but it could be other values as well.

In the embodiment shown in FIG. 4, variable frequency clock circuit 52 also includes divider circuit 70 which divides the output signal 74 from voltage controlled oscillator 68 to provide the clock signal 30 to sample components 24 and 26 (shown in FIG. 2). In one embodiment, divider circuit 70 divides the frequency of the output signal 74 from voltage controlled oscillator 68, by 20. However, it could divide that signal by other values as desired, or divider circuit 70 could be eliminated.

It can thus be seen that, while variable frequency clock circuit 52 provides two different selectable frequencies of clock 30, it could just as easily be designed to provide 3 or more different frequencies. By simply adding resistors and switches to the resistive network shown in FIG. 4, by providing multiple outputs from logic component 66, or by providing multiple logic components (and, for example, multiple comparators in harmonic energy detector 34), voltage controlled oscillator 68 can be provided to select from among three or more separate frequencies as well. This provides options that can avoid errors due to a multi-frequency interference signal.

Figure 5:
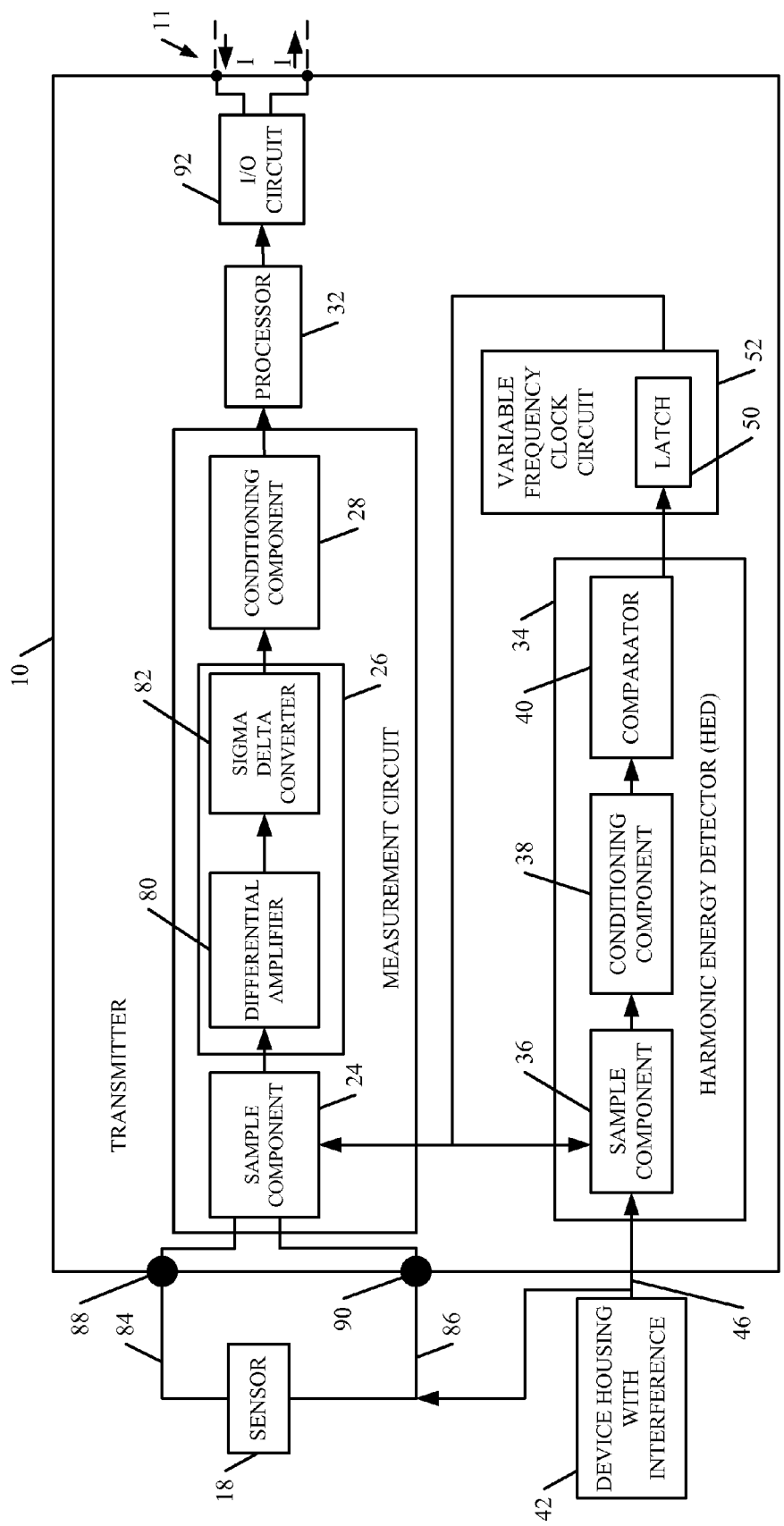
FIG. 5 is a block diagram showing the transmitter of FIG. 1 with the A/D converter shown in more detail.

FIG. 5 is a block diagram of transmitter 10 which is similar to that shown in FIG. 2, and similar items are similarly numbered. However, FIG. 5 shows that, in one embodiment, A/D converter 26 has a differential amplifier 80 and a sigma delta converter 82. Sigma delta converter 82 is shown by way of example, and other conversion mechanisms can be used as well.

FIG. 5 also shows that sensor 18 illustratively has two leads 84 and 86 that can be coupled to input terminals 88 and 90, respectively. In one embodiment, the voltage across terminals 88 and 90 is indicative of the temperature sensed by sensor 18. It will also be noted that sensor 18 can illustratively be a four lead sensor with additional leads coupled to additional terminals. Or, additional sensors can be coupled to those terminals and a multiplexer can be used to select input signals for measurement. However, for the sake of the present example, the description proceeds with respect to sensor 18 having two leads connected to terminals 88 and 90, respectively.

In addition, FIG. 5 shows that processor 32 illustratively provides a representation of the sensor signal to I/O circuit 92. I/O circuit 92 transmits information in a digital format on loop 11, or in an analog format, by controlling the current through loop 11. The information related to the sensed parameter (sensed by sensor 18) is provided over process control loop 11 by transmitter 10.

It can thus be seen that variable frequency clock circuit 52 is used to set the system sample frequency such that external interference applied to the system does not cause appreciable output error. A closed loop feedback system is used to control the system sample frequency. Harmonic energy detector 34 samples the interference signal using the same clock at the same system sample frequency. The harmonic energy detector 34 sends a trigger signal to the variable frequency clock circuit 52 when the harmonic energy in the interference reaches a level that could cause appreciable error in the measured variable. When the variable frequency clock circuit 52 receives the trigger signal 48, it changes the output frequency to a new frequency that is sufficiently spaced from the prior frequency such that interference no longer causes the harmonic energy detector to have an active trigger signal 48. In one embodiment, variable frequency clock circuit 52 toggles between two spaced frequencies. However, the number of frequencies can be expanded to more than two to allow for an increased probability that objectionable interference can be avoided.

Figure 6:
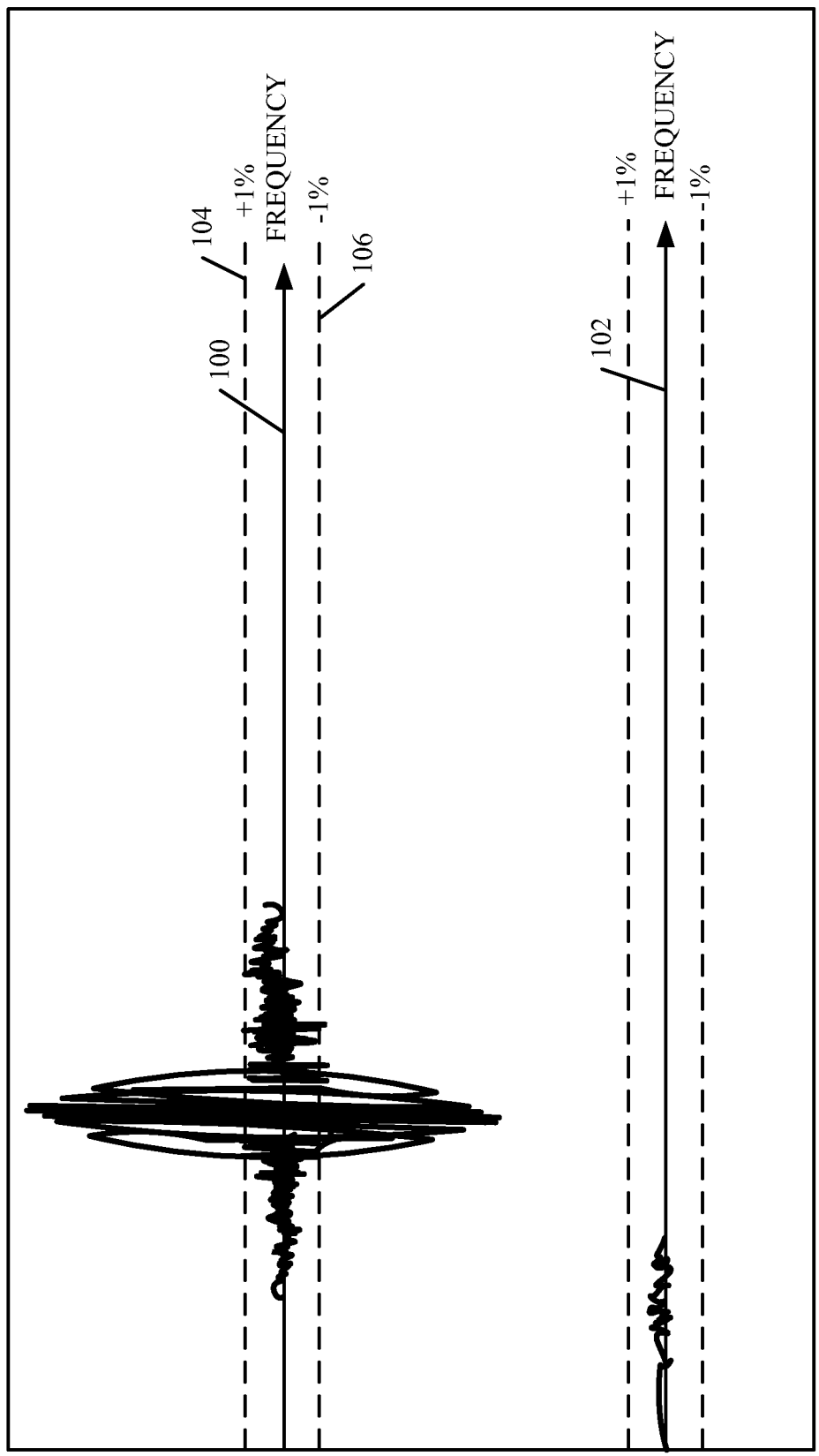
FIG. 6 shows two frequency sweeps that illustrate test results.

FIG. 6 shows a graph of test results for a baseline system (in which only a single clock system sample frequency was used) and a modified system where variable frequency clock circuit 52 is used to change the sensor sampling frequency when harmonic energy detector 34 detects objectionable interference at the sensor sampling frequency. FIG. 6 shows that the error occurs in a very narrow band of frequencies. When the EMC test is run, the frequency is swept over a large range. It only spends a very brief time in the narrow band where the error is large. However, in a field application, the interference may be persistent in the narrow band of frequencies. So, the error versus time plot can look like a very slowly changing offset error, and not like a narrow band error at all.

FIG. 6 shows two plots 100 and 102. Plot 100 is for the baseline system while plot 102 is for the system with the variable clock frequencies. In the embodiment shown, the sensor sampling frequency is 23.5 kHz. The interference frequency is swept from 23.44 kHz to 23.71 kHz in a time window of 200 seconds. The plot 100 shows two lines 104 and 106 that show +/−1 percent of span error bands. The highest analog error occurs at a frequency of approximately 23.49 kHz, which is near the fundamental sampling frequency of 23.5 kHz. In that instance, the magnitude of the error is high enough to saturate the output of a 4-20 mA process transmitter.

Prior to sweeping the frequency range for plot 102, the sensor sampling frequency was 23.5 kHz. When harmonic energy detector 34 detected energy at the sampling frequency (or harmonic), the variable frequency clock circuit 52 changed the sampling frequency to 23.7 kHz and the results show an analog error magnitude within the +/−1 percent of span for the device under test. Compared to the baseline system which measured greater than 50 percent of span, the device under test with the variable clock frequency is less than 1 percent of span. This shows in excess of a 50:1 error reduction in the narrow band EMC conducted RF device sensitivity.

Although the present invention has been described with reference to preferred embodiments, workers skilled in the art will recognize that changes may be made in form and detail without departing from the spirit and scope of the invention.

What is claimed is:
1. A process variable transmitter, comprising:
  a housing;
  a measurement circuit that receives a sampling clock signal at a first sampling frequency and samples an analog sensor signal, indicative of a sensed process variable, at the first sampling frequency, and converts the sampled analog sensor signal into a digital signal;

a harmonic energy detector that receives the sampling clock signal and samples interference coupled to the housing at the first sampling frequency and generates a trigger signal if the interference meets a threshold interference value;

a variable frequency clock circuit that receives the trigger signal and, in response to the trigger signal, changes the frequency of the sampling clock signal to an alternate sampling frequency, different from the first sampling frequency; and a processor that receives the digital signal and provides an output indicative of the sensed process variable.

2. The process variable transmitter of claim 1 wherein the variable frequency clock circuit is configured to change the frequency of the sampling clock signal to the alternate sampling frequency that is different from the first sampling frequency by a threshold frequency amount.

3. The process variable transmitter of claim 2 wherein the threshold frequency amount exceeds a narrow band of sensitivity corresponding to the first sampling frequency.

4. The process variable transmitter of claim 1 wherein the harmonic energy detector is configured to determine whether the sampled interference meets the threshold interference value at a frequency within a threshold distance of the first sampling frequency or a harmonic of the first sampling frequency.

5. The process variable transmitter of claim 4 wherein the harmonic energy detector further comprises:
a comparator that generates the trigger signal if the sampled interference has a threshold energy level within a narrow band of sensitivity of a harmonic of the first sampling frequency.

6. The process variable transmitter of claim 1 wherein the variable frequency clock circuit is configured to, in response to the trigger signal, change the frequency of the sampling clock to one of a plurality of alternate sampling frequencies.

7. The process variable transmitter of claim 1 wherein the variable frequency clock signal comprises:
a voltage controlled oscillator that receives a voltage input signal and provides an oscillator output signal, as a function of the voltage input signal, the sampling clock signal being generated from the oscillator output signal;
a resistive network with a set of switches, the configuration of the set of switches controlling a value of the voltage input signal; and
a logic circuit that receives the trigger signal and controls the set of switches to change the voltage input signal.

8. The process variable transmitter of claim 1 and further comprising:
an input/output (I/O) circuit that receives the output from the processor and controls a loop to provide an indication of the sensed process variable.

9. The process variable transmitter of claim 8 wherein the loop comprises a 4-20 mA process control loop.

10. A method of controlling a process variable transmitter, comprising:
sampling an analog sensor signal indicative of a sensed process variable at a first sensor sampling frequency;
converting the sampled sensor signal to a digital value;
providing an output on a process control loop indicative of the digital value;
sampling interference coupled to a housing of the process variable transmitter at the first sensor sampling frequency;

in response to determining that the sampled interference meets a threshold interference value, changing the first sensor sampling frequency to an alternate sensor sampling frequency, different from the first sensor sampling frequency.

11. The method of claim 10 wherein changing the first sensor sampling frequency to the alternative sensor sampling frequency comprises:
determining whether the sampled interference exceeds the threshold interference value at a frequency within a threshold range of the first sensor sampling frequency or a harmonic of the first sensor sampling frequency.

12. The method of claim 11 wherein the threshold range comprises a band of sensitivity corresponding to the first sensor sampling frequency.

13. The method of claim 11 wherein changing the first sensor sampling frequency comprises:
changing the first sensor sampling frequency to the alternate sensor sampling frequency that is at least a minimum distance from the first sensor sampling frequency and that exceeds the threshold range.

14. The method of claim 13 wherein the minimum distance comprises the threshold range plus a margin.

15. The method claim 10 wherein changing the first sensor sampling frequency comprises:
changing the first sensor sampling frequency to one of a plurality of alternate sensor sampling frequencies.

16. The method of claim 10 wherein providing the output on a process control loop comprises:
providing the output on a 4-20 mA process control loop.

17. A process variable transmitter, comprising:
a sample component that receives a sampling clock signal and that samples an analog sensor signal at a first sampling clock frequency;
an analog-to-digital converter, coupled to the sample component, that converts the sampled analog sensor signal to a digital value;
a processor that provides an output signal indicative of the digital value;
an interference detector that detects whether interference in an interference signal coupled to a housing of the process variable transmitter causes narrow band errors in the output signal and, in response, provides an interference detector output signal; and
a variable frequency clock circuit that receives the interference detector output signal and, in response, changes the first sampling clock frequency to an alternate sampling clock frequency.

18. The process variable transmitter of claim 17 wherein the variable frequency clock circuit changes the first sampling clock frequency to one of a plurality of different alternate sampling clock frequencies.

19. The process variable transmitter of claim 17 wherein the interference detector comprises:
an interference sample component and wherein the interference detector detects whether the interference causes the narrow band errors by sampling the interference signal, with the interference sample component, at a same frequency at which the sample component samples the analog sensor signal.

20. The process variable transmitter of claim 19 wherein the interference sample component samples the interference signal using the sample clock signal.

* * * * *